May 12, 1936.  S. W. SEVERANCE ET AL  2,040,674
CONTACT PIN FOR VACUUM TUBES AND METHOD OF MOLDING
Filed Sept. 11, 1929
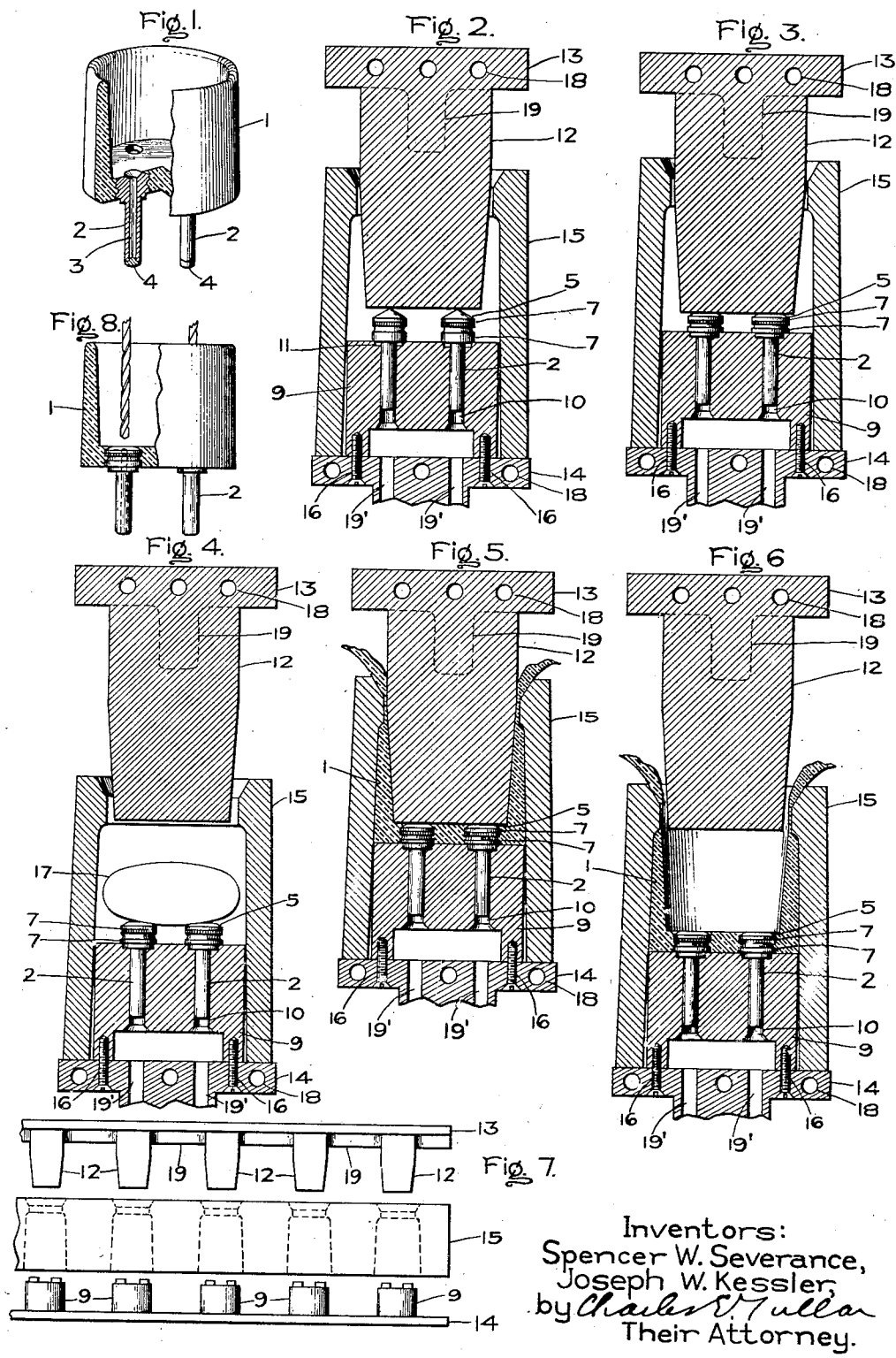
Inventors:
Spencer W. Severance,
Joseph W. Kessler,
by Charles E. Mullen
Their Attorney.

Patented May 12, 1936

2,040,674

UNITED STATES PATENT OFFICE 2,040,674

CONTACT PIN FOR VACUUM TUBES AND METHOD OF MOLDING

Spencer W. Severance and Joseph W. Kessler, Pittsfield, Mass., assignors to General Electric Company, a corporation of New York Application September 11, 1929, Serial No. 391,960

7 Claims. (Cl. 29—155.55)

The invention relates to receptacles and more particularly to sockets serving as bases for thermionic devices, lamps and the like.

Bases of this character are usually made of molded material and provided with a plurality of contact pins, the latter being connected to electrical members within the bulb and arranged to contact with terminals of electrical circuits. The contact pins are ordinarily made from metal rod material and terminate in an enlarged head portion which is molded in the base, the head being preferably of the same thickness as the depth of molded material so as to present a smooth surface on the interior of the base. The pins are made in quantity production and it has been found in practice that they vary in size particularly in the thickness of the head so that when the pins are molded in place the top surface may fail to lie flush with the interior of the base. In the case of an undersized head, the top of the pin is lower than the interior surface of the bottom of base and there is left a layer of compound on the head which is hard to penetrate when the wire-way is opened through the contact pin, as described hereinafter. On the other hand, when the pin is oversized, the forming die first strikes the top of the head which thereupon prevents the compressing movement of the die being completed and precludes the proper amount of pressure being applied to the compound. It is therefore desirable to have the thickness of head of the pin accurate so as to eliminate the foregoing disadvantages.

An object of the present invention is to improve the art of molding bases provided with contact pins with a view toward insuring the proper dimension of pin head. This object is attained in brief, by shaping the head to such a configuration as to lend itself readily to further working of the metal prior to molding so as to effect an accurate dimension and shape of the head portion. The working of the metal to the proper dimension and shape is preferably performed in the same apparatus as does the molding.

It has further been found that in the three-part mold ordinarily employed in the manufacture of bases of this kind, the finished bases tend to stick or adhere to the various mold sections in an indiscriminate manner so that during a molding operation or successive operations, portions of the bases of a given group, or the entire group in the case of two operations, may be found clinging to different mold sections which precludes the use of automatic mechanism for removing the bases. The bases first have to be located on the various mold sections and then individually picked by hand which operation consumes considerable time. Accordingly, another object of my invention is to provide an improved molding arrangement which will assure the molded bases remaining in a definite position in the mold when the latter is opened thereby to facilitate the removal of the bases. This object is accomplished by forcing a portion of each pin into a particular part of the mold to which the pin positively adheres until removed at the end of the molding operation.

Further objects and features will be apparent as the specification is perused in connection with the accompanying drawing, in which Fig. 1 represents a view in perspective of the finished tube base; Figs. 2 and 3 show a section of the mold with the various parts in different positions during a preliminary operation on the contact pins; Figs. 4, 5 and 6 illustrate the relative positions of the mold sections during the molding operation; Fig. 7 diagrammatically illustrates a gang mold while Fig. 8 shows the method of opening up the wire-way in the contact pin after the molding operation.

Referring to Fig. 1, numeral 1 indicates a base suitable for mounting on the tapered end of a vacuum tube, such as a radio tube or incandescent lamp. The base is molded under pressure and heat from a phenolic condensation product or equivalent material, and is provided with a plurality of contact pins 2 for connecting the electrodes within the tube to external circuits. The pins have a drilled central bore 3 which serves as a wire-way for the leading-in conductors (not shown), the bore being closed at the bottom by a spot of solder 4 which also secures the conductor to the pin.

In accordance with one feature of our invention the pins are provided with a head portion 5, shown more clearly in Fig. 2, having a larger diameter than the remaining portion and terminating in a cone or other configuration which lends itself readily to crushing. There is a groove cut in the periphery of the head portion about half-way down, leaving two overhanging flanges 7, 7. The upper flange preferably is knurled to provide anchorage in the moldable material; the lower flange provides material which, in accordance with another feature of our invention, may be forced and sheared into a part of the mold for temporary retaining purposes as will be explained hereinafter. The conical or equivalent shaped head offers a practical method of obtaining an accurate dimension of thickness of the head portion, thereby insuring the upper surface of the head to lie flush with the bottom of the base 1 when molded in place. The pins of the prior art ordinarily have a flat top, i. e. not conical as we propose, and it has been found that when made in quantity production the depth of the head is often over-size and it is difficult, if not wholly impractical, to reduce pins of this character to the proper dimensions.

In accordance with our invention, the depth of head, as measured from the under side of the lower flange 7 to the apex of the cone is made thicker than the desired depth of the material in the base 1. The conical portion is then compressed or crushed to an accurate thickness between two pressure surfaces or platens, either in a separate mechanism or preferably in the same apparatus as performs the subsequent molding operation. Thus in Fig. 2 there is illustrated a lower cylindrical platen 9 provided with openings 10 into which the shank of the pins 2 may be inserted rather loosely, with the head resting on the upper surface of the platen. The openings are counter-bored at the top for a relatively short distance, the diameter of the counterbore 11 being slightly less than the diameter of the flange portion 7. Arranged in opposed relation to the lower platen member there is an upper platen 12 which may also constitute a cylinder, tapering down to a smaller diameter at the bottom, the amount of taper coinciding with the interior diameter of the base member 1, as will be explained in connection with the molding operation. It will be understood that pressure may be applied to either one or both of the platens through suitable wellknown mechanism, hydraulic or mechanical, although it is preferred to maintain the upper platen fixed and to force the lower platen upwardly into the compressing or crushing position.

In order to facilitate the application of pressure to the platens, the latter are provided with enlargements 13, 14 which extend at least to the width of the middle mold section 15. The enlarged member 14 may be secured to the platen 9 by means of screws 16 or in any other manner and contains openings 19' which are in line with openings 10. Figs. 2 and 3 show various positions of the lower platen with the contact pins in place and it will be observed that during the compressing operation, not only is the conical head portion crushed to the proper thickness which may be accurately and reproducibly gaged, but the lower flange 7 of the head is sheared and seats itself within the counter bore 11. The head of the pin is thus held by friction in the lower platen. It will also be noted that during this operation the mold section 15, which is free to move in the vertical direction performs no function, but rides upwardly on the ledge formed between the platen 9 and the plate member 14. After the head has been crushed or compressed to the proper thickness and forced into the counter-bore, the lower platen recedes and carries with it the pins. As shown in Fig. 3, the middle section 15 falls back with the lower platen by reason of its weight, still resting on the ledge.

The next step in the process is that of molding the base about the pins and is illustrated in Figs. 4, 5 and 6. The moldable material of which the base is to be formed may constitute a molding mixture containing a phenolic condensation product or similar material, capable of withstanding relatively great variations of temperature and atmospheric conditions, as well as having good insulating properties. The material is introduced into the mold preferably in pellet form, either as a plate or oval shaped member 17, compressed into a solid body from powdered material. In order to insert the pellet in its proper place for molding, the lower platen 9 and middle mold section 15 are moved downwardly a distance sufficient to allow the pellet to pass freely between the upper edge of said section and the upper platen 12. The pellet takes up a position resting on the crushed surfaces of the contact pins as shown. Suitable pressure may then be applied upwardly to the lower platen which moves toward the fixed upper platen and carries with it the section 15. The platens are simultaneously heated in any suitable manner for example, by passing steam through the conduits 18. As the moving members approach one another, the pellet is rendered plastic due to heat until when the platens are in the closest position as shown in Fig. 5, the moldable material assumes a molded form defined by the interior surfaces of the three-part mold.

It is apparent that the middle section 15 determines the outer periphery of the molded base while the platen sections provide the contour of the remaining portions. The excess moldable material may extrude through an annular opening left between the interior surface of the middle mold section and the periphery of the upper platen. It is also evident that the relative movement of the lower platen with respect to the upper platen during this operation is the same as in the previous operation, i. e., in which the head of the pin is simply crushed to proper dimension, hence the same apparatus may perform both operations.

After the base has been molded in this manner with the contact pins held rigidly in place, the lower platen and middle section are moved as a unit downwardly a distance sufficient to disengage the upper platen from the base whereupon the middle section is caught and maintained stationary by an obstruction (not shown), the lower platen being allowed to continue the downward movement and carrying the base with it. The base is thus set free of the upper and middle mold sections and is held to the lower platen by reason of the friction between the sheared flange portion and the counter-bore 11. The amount of friction obtained in this manner may be carefully gaged by proper determination of the counter-bore depth and the amount of shearing so that the bases with the pins molded in place may be readily taken from the platen in any suitable manner, automatic or otherwise.

A preferred method of removing the bases is to detach the plate 14 carrying the lower platens and bases from the mold and to operate on the under side of the plate by a device or machine (not shown) provided with a series of knock-out pins. These pins are arranged in a group corresponding to the positions of the openings 10 and 19', which they enter to force out the head of the pins 2 from the counter-bore 11 and break the adhesion between the composition and the metal. The fact that the base positively adheres to the lower platen as the mold is opened, in accordance with our invention, is advantageous because it definitely sets the position of each base in a portion of the mold, and in addition, temporarily attaches the base to that portion of the mold which offers the least resistance to breaking the joint when the base is molded.

In the prior art devices, the molded bases would adhere to one or the other of the mold sections in a haphazard manner, and the operation of removing the bases from the sections was rendered difficult. Moreover, under the prior art conditions, when the base adhered either to the middle section or the upper platen, instead of the lower platen, the increased surface tension between the base material and metal about the peripheral area of the base, i. e. the interior and exterior cylindrical surfaces, would be so great as to call for considerable prying before the base could be detached. It is apparent that such difficulties have no place in quantity production methods. It will also be noted that inasmuch as the head of the pin has been previously crushed or worked to the proper thickness, the upper surface thereof lies flush with the interior of the base and presents a metallic surface to be operated upon by the device for opening the wire-way as will be described hereinafter and in addition, allows the full amount of pressure to be applied by the platen to the moldable compound.

The compressing and molding operations are usually performed in multiple or gang molds for quantity base production, an example being diagrammatically shown in Fig. 7. The platens 9 and 12 are mounted on the plates 13, 14 which may assume any convenient width and length while the middle section 15 is constituted of a block of metal provided with a plurality of suitably shaped cylindrical openings constituting the interior of each mold. If desired, and as shown in the figure, a strengthening web 19 may be secured between adjacent pairs of platens 12.

The bases after being taken from the mold have adhering thereto fins of excess compound which may be removed in any well-known manner. The pins are initially provided with a hole along the axis e. g. by drilling, the length of which is such as to stop short of the upper surface of the head, leaving a thin integral wall of metal which, during the molding operation, precludes the moldable material from clogging the bore. It is therefore necessary to open up the bore or wire-way by removing the metallic wall after completion of the molding operation so that conductors may be threaded and joined to the lower end of the pin by solder. This operation may be performed in perforating in case the wall is thin, but preferably by drilling in a gang drill-press, as illustrated in Fig. 8. It will be observed that only the tapered portion of the drill need enter the pin to complete the bore and further, that the drill operates directly on metal and not on the molded compound which would dull the cutting edge and cause other deleterious effects.

What we claim as new and desire to secure by Letters Patent of the United States, is:

1. A metal contact pin constituted entirely of rod material and terminating at one end in a solid crushable head of substantially conical configuration and at the other end, in a portion of uniform diameter smaller than said head, said pin having a hole which is adapted to receive a conductor and which extends through the entire length of the pin except for a short distance from the head end.

2. In the method of producing in a multi-section mold, a molded base provided with contact pins, the steps of providing each pin with a dimension larger than the dimension of the finished pin, compressing the pin to the proper finished dimension and simultaneously forcing a portion of each pin into one of the mold sections, molding the base about the pins and removing the base from the mold by withdrawing the section into which the pins are forced.

3. In the method of producing in a multi-section mold, a molded base provided with contact pins, the steps of providing each pin with a dimension larger than the dimension of the finished pin, compressing the pin to the proper finished dimension between two sections of the mold, molding the base about the pins and removing the molded base from the mold.

4. In the method of producing, in a multi-section mold, a molded base provided with contact pins, the steps of providing each pin with a configuration whose size is greater than the size of the finished pin, shaping the pin to the proper finished size within the mold and simultaneously forcing a portion of each pin into one of the mold sections, molding the base about the pins and removing the base from the mold by withdrawing the section into which the pins are forced.

5. The method of molding a pin in a base for a vacuum tube, said method comprising the steps of providing the pin with a crushable head having a thickness greater than the thickness of the finished base, crushing the head of the pin to the same thickness as the molded base and simultaneously locating the pin in the mold and molding the base material in a plastic condition about the pin.

6. In the art of manufacturing molded bases for vacuum tubes and provided with contact pins, said pins being made of rod material and having a a longitudinal opening which extends over only a limited portion of the pin and leaving a thin web of metal at one end, said pin being provided at said web end with a crushable head having a thickness greater than the thickness of the finished base, the method which consists in crushing the head of the pin to the same thickness as the molded base and simultaneously locating the pin in the mold, molding the base material in a plastic condition about the pin, and removing the metal of the web in order to complete the longitudinal opening through the entire length of the pin.

7. A metal contact pin constituted entirely of rod material and terminating at one end in a solid crushable head of substantially conical configuration and tapering substantially to a point, and at the other end in a portion of uniform diameter smaller than said head, said pin having a hole which is adapted to receive a conductor and which extends through the entire length of the pin except for a short distance from the head end.

SPENCER W. SEVERANCE.
JOSEPH W. KESSLER.